United States Patent
Hartmann et al.

(10) Patent No.: US 10,030,719 B2
(45) Date of Patent: Jul. 24, 2018

(54) CLUTCH

(71) Applicant: Schaeffler Technologies AG & Co. KG, Herzogenaurach (DE)

(72) Inventors: Horst Hartmann, Aurachtal (DE); Ralph Schimpf, Furth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 86 days.

(21) Appl. No.: 15/190,708

(22) Filed: Jun. 23, 2016

(65) Prior Publication Data

US 2017/0058969 A1    Mar. 2, 2017

(30) Foreign Application Priority Data

Aug. 27, 2015  (DE) .................. 10 2015 216 367

(51) Int. Cl.
| | |
|---|---|
| F16D 41/06 | (2006.01) |
| F16D 41/061 | (2006.01) |
| F16D 41/20 | (2006.01) |
| F16D 13/18 | (2006.01) |
| F16D 13/28 | (2006.01) |
| F16D 23/12 | (2006.01) |

(52) U.S. Cl.
CPC .......... *F16D 41/061* (2013.01); *F16D 13/18* (2013.01); *F16D 13/28* (2013.01); *F16D 41/20* (2013.01); *F16D 2023/123* (2013.01)

(58) Field of Classification Search
CPC ...... F16D 41/061; F16D 13/18; F16D 41/063; F16D 2023/123; F16D 41/20; F16D 13/28

See application file for complete search history.

(56) References Cited

U.S. PATENT DOCUMENTS

2014/0332335 A1*  11/2014  Strong ............... F16D 41/06
                                                             192/43
2017/0058965 A1*   3/2017  Schimpf ............ F16D 13/26

FOREIGN PATENT DOCUMENTS

WO     2015015320    2/2015

* cited by examiner

*Primary Examiner* — Ramya P Burgess
*Assistant Examiner* — Lillian T Nguyen
(74) *Attorney, Agent, or Firm* — Volpe and Koenig, P.C.

(57) ABSTRACT

A clutch (1) with an inner ring (2) arranged about an axis of rotation (d) and an outer ring (3) arranged coaxially in reference thereto, as well as an elastic clamping ring (4) arranged between them and radially limited thereby, with the inner ring (2) and the clamping ring (4) resting on each other via a ramp device (9), arranged bi-directionally effective in the circumferential direction, and clamping segments (13) pointing radially outwardly and arranged distributed in the circumferential direction, form in case of a radial displacement of the clamping ring (4) forming with the outer ring (3) a clamping connection in at least one circumferential direction. In a further aspect, a radial displacement of the clamping ring (4) is provided via a ramp device (12) effective in the axial direction, switched by an axial displacement of the inner ring (2) in reference to the clamping ring (4).

7 Claims, 1 Drawing Sheet

CLUTCH

INCORPORATION BE REFERENCE

The following documents are incorporated herein by reference as if fully set forth: German Patent Application No. DE 102015216367.9, filed Aug. 27, 2015.

BACKGROUND

The invention relates to a clutch with an inner ring arranged about a rotary axis and an outer ring arranged coaxially in reference thereto, as well as an elastic clamping ring arranged between them and radially limited, with the inner ring and the clamping ring resting on each other via a ramp device arranged in the circumferential direction and bi-directionally effective, and clamping segments pointing radially outwardly arranged distributed over the circumference in case of a radial displacement of the clamping ring form a detachable connection with the outer ring, at least in one circumferential direction.

Generic clutches are known for example from WO 2015/015320 A2. Here an inner ring rests on a shaft gear of a shaft in a torque-proof fashion and has an outer perimeter embodied in the form of a traverse, on which a clamping ring rests showing a complementary inner perimeter. An axially displaceable shift ring is arranged radially between the clamping ring and an outer ring, comprising a ramp device axially effective in reference to the outer ring. In case of an axial displacement of the shift ring in the direction of the inclining ramp of the ramp device, here a clamping connection forms between the clamping ring, the shift ring, and the outer ring, which is released by an opposite displacement of the shift ring.

SUMMARY

The objective of the invention is a beneficial further development of a generic clutch. In particular, the clutch shall have a simple design and comprise as few components as possible.

The objective is attained with a clutch having one or more features of the invention. Advantageous embodiments are provided below and in the claims.

The present clutch includes an inner ring, arranged about an axis of rotation, and an outer ring arranged coaxially in reference thereto, as well as an elastic clamping ring arranged between them and radially limited thereby. The clutch can therefore be formed from three parts in the simplest case. By a ramp device arranged in the circumferential direction and bi-directionally effective the inner ring and the clamping ring rest on each other. Here, a moment can be transmitted in both rotational directions between the clamping ring and the inner ring. At the clamping ring, pointing radially towards the outside, clamping segments are provided, distributed over the circumference, which in case of a radial pre-stressing of the clamping ring with the outer ring, form a clamping connection, at least in one circumferential direction.

The clamping connection is here switched by a radial displacement of the clamping ring provided via a ramp device, which is effective in the axial direction, by an axial displacement of the inner ring switched in reference to the clamping ring. This means that the ramp device in the form of axially inclined ramps is provided at the inner ring and at the clamping ring, particularly at its clamping segments. By an inner ring, displaced from the outside, for example by an actuator, oil pressure of an applicator surrounded by a pressure medium, a torque-dependent displacement of the inner ring, for example due to a part showing a slew gear or the like, the clamping ring is displaced radially outwardly at the axially inclining ramps such that the clamping segments form with the inner perimeter of the exterior ring the detachable, moment-transferring connection such that the clutch is effective between the inner ring and the outer ring. When reversing the inner ring, the clutch is opened again by a gap develops between the clamping segments and the outer ring due to the radial reverse displacement of the clamping ring. Providing the ramp device directly between the inner ring and the clamping ring allows using fewer parts. For the embodiment of a radial elasticity of the clamping ring, sufficiently wide recesses may be provided between the clamping segments. Furthermore, the clamping segments may have dividing recesses for example, cut in radially from the inside and/or radially from the outside. The radially inner and radially outer recesses may be embodied radially positioned over top of each other and, in reference to the cross-section of the clamping ring, form bridges having a reduced cross-section at the clamping segments. Alternatively or additionally the clamping ring may be slotted at one side, thus embodied open at one side such that a radial displacement is facilitated, generating an enlarged diameter of the clamping ring.

In an elastic embodiment of the connection between the clamping ring and the inner ring the clamping ring can be embodied along the ramp device with ramps inclining at both sides in the circumferential direction and able to distortion to a limited extent, so that it is displaced under the influence of a moment at least slightly radially towards the outside in reference to the inner ring and thus self-reinforcement of the engagement of the clamping ring can be affected in reference to the outer ring.

In order to hold the clamping ring at the inner ring and thus avoid any contact with the outer ring when the clutch is open, here the clamping ring can be pre-stressed in reference to the inner ring.

The clutch may be provided with a detachable connection, which is embodied as a force-fitting clamping connection and/or a positive connection. In case of a clamping connection, the clamping segments can form peaks radially at the outside. In order to increase the normal force of the clamping segments in reference to the outer ring when the clutch is closed, the peaks may show a reduced cross-section, for example like a pitched roof. Here the clamping segments may show a clamping segment angle, which is smaller than an opening angle of the annular groove inserted in the inner perimeter of the outer ring.

According to an advantageous embodiment the clutch may be embodied acting gradually in a force-fitting and form-fitting fashion. This way, for example by a radial displacement of the clamping segments via an axial displacement of the inner ring, a clamping connection is formed and, when it slides through, a positive connection develops by the clamping segments sliding into respective pockets and latching there. Thus, here a positive connection forms after the formation of the clamping connection.

According to an advantageous embodiment the clutch includes, in addition to the switchable detachable connection, a friction clutch radially inside the inner ring. The friction clutch is embodied as a wet-running friction clutch, for example, which shows an input part and an output part, with the input part and the output part each alternating laminated blades being allocated, with the blades forming a friction-fitting connection under pressure.

According to an advantageous embodiment the inner ring may form a disk support for the blades of the input and the output part. For this purpose, an inner profile is provided at the input part, such as an inner gear, in which the blades are suspended in a torque-proof fashion. The outer profiling with the bidirectional ramps formed in the circumferential direction and the inner profile can be formed during the production of the inner ring without requiring separate tools.

In other words, a particularly easily produced clutch without classic gearing is suggested here. The blocking between the inner ring and the outer ring is preferably performed by a clamping in the radial direction. This way, a simple and cost-effective production is yielded as well as low stress. By using sheet-metal parts, here a simple production is ensured.

Furthermore, no single-trach method, such as synchronization, is required like in gearing.

The invention may show the following advantageous features in a list, which shall not be considered conclusive:
- Activating the clutch by an axial displacement of the inner ring and a radial expansion of the clamping ring (wedge plate),
- Ramps being arranged in the circumferential direction at both sides between the clamping ring and the inner ring (push and pull-operation),
- An axial ramp device, in order to generate a clamping contact at the outer diameter of the clamping ring and a groove of the outer ring,
- Friction-fitting clamping condition between the clamping ring and the outer ring with a groove,
- In the deactivated state no contact between the clamping ring and the outer ring,
- The clamping ring is radially pre-stressed on the inner ramps of the inner ring.

At the inner diameter the inner ring may show gears for the inner blades of a wet-operating clutch. Furthermore, bi-directional ramps are provided at the inner ring for the pull and push-operation of the clutch at the outer perimeter of the inner ring in the circumferential direction. Further, the outer diameter of the inner ring shows an incline in the axial direction. This incline is preferably greater than the self-locking limit of the clamping connection between the clamping ring and the outer ring.

For the push and pull operation the clamping ring shows bidirectional ramps at the inner perimeter in the circumferential direction. Therefore, here an incline is provided at the clamping segments in the axial direction, complementary to the incline of the inner ring. A friction-fitting contact is provided at the outer perimeter in reference to the outer ring, for example an annular groove of the outer ring. At the outer diameter of the clamping segments a bevel may be provided in order to increase the normal force as well as to serve for the axial stop in reference to the outer ring, such as an annular groove.

An outer ring may be equipped with a groove at the inner perimeter according to a clamping free-wheel (wedge clutch). A positive connection, such as gearing, may be provided at the outer perimeter for connecting the outer ring to a housing or the like.

In the disengaged state of the clutch, the clamping ring is placed in a pre-stressed condition on the inner ring and is not in contact via its outer perimeter with the outer ring and its groove, respectively. The pre-stressing is facilitated by severing the clamping ring.

In order to shift the clutch, the inner ring is axially displaced so that the clamping ring expands and generates a contact to the outer ring. By this contact here a friction moment develops, which displaces the clamping ring along the ramps at the inner ring towards a greater diameter, and thus leads to clamping and a force-fitting connection. Now the clutch is closed.

BRIEF DESCRIPTION OF THE DRAWINGS

The invention is explained in greater detail based on an exemplary embodiment shown in FIGS. 1 and 2. Shown are.

DETAILED DESCRIPTION OF THE PREFERRED EMBODIMENT

Figure 1:
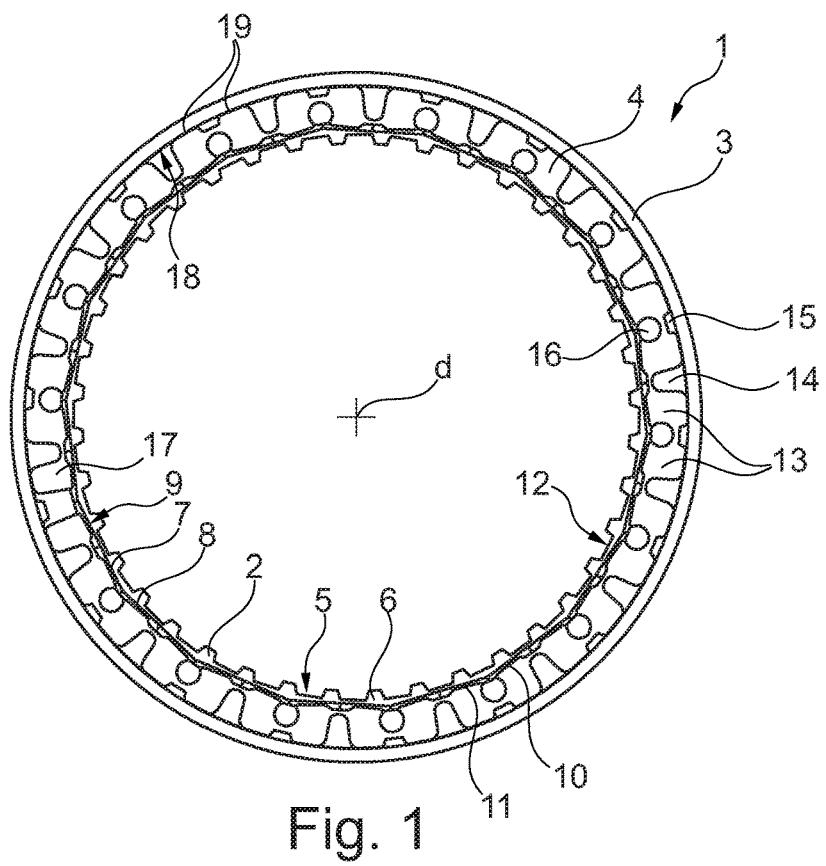
FIG. 1 an illustration of the clutch arranged about an axis of rotation, and FIG. 2 the upper part of the clutch in a cross-section.

FIG. 1 shows an illustration of the clutch 1, arranged about an axis of rotation d. The clutch comprises an inner ring 2 and an outer ring 3 as well as a clamping ring 4 arranged therebetween. At its inner perimeter 5, the inner ring 2 has the inner gears 6 to accept blades of a wet-running friction clutch. In this regard, the inner ring serves as a disk support, such as an outer disk support.

The inner ring 2 has at its outer perimeter, distributed over the circumference, alternating inclining rumps 7, 8 in both circumferential directions, at which the clamping ring 4 rests via ramps 10, 11, embodied complementary to the ramps 7, 8, forming the ramp device 9. Additionally the ramp device 12 with axial ramps is embodied between the inner ring 2 and the clamping ring 4, shown in FIG. 2.

The clamping ring 4 comprises clamping segments 13, distributed over the circumference and expanding radially towards the outside, which are separated from each other via recesses 14, 15, 16 inserted radially from the inside and radially from the outside, and this way allow a radial displacement of the clamping ring 4 while expanding the recesses 14, 15, 16. Additionally, the clamping ring 4 is opened at one side via a penetration 17. The clamping ring 4 rests on the inner ring 2 in a radially pre-stressed fashion.

Depending on the shifting status of the clutch 1, the clamping segments 13 generate a clamping contact with the inner circumference 18 of the outer ring 3. For this purpose, the clamping areas 19 are formed radially outside at the clamping segments 13. The outer ring 3 may be connected, in a manner not shown, with its outer perimeter to a housing in a positive, friction-fitting, or material-to-material bonding fashion, or the like.

Figure 2:
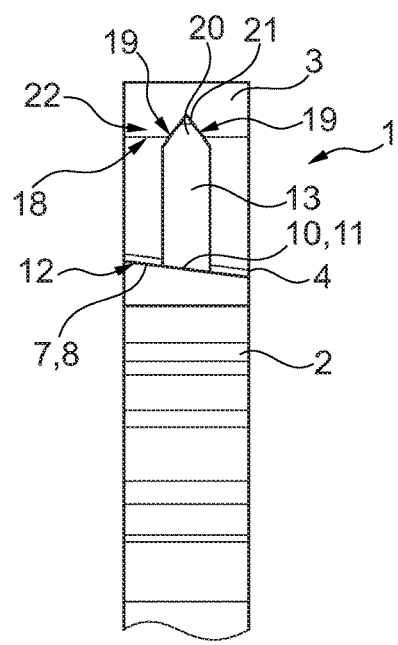

FIG. 2 shows the clutch 1 of FIG. 1 in a partial cross-section with the inner ring 2, the outer ring 3, and the clamping ring 4. The embodiment of ramp device 12 is discernible from FIG. 2. The ramps 7, 8 of the inner ring 2 and the ramps 10, 11 of the clamping ring 4, complementary thereto, and/or the clamping segments 13 are formed as axially inclining ramps. In order to increase the normal force when forming the clamping connection 22, the clamping segments 13 extend radially to the peaks 20, which form with their clamping areas 19 the clamping contact with the groove formed at the inner circumference 18 of the outer ring 3, such as the annular grove 21. The function of the clutch 1 is explained based on the joint review of FIGS. 1 and 2. When the clutch 1 is open, the clamping ring 4 is radially pre-stressed on the inner ring 2 without the ramps 7, 8, 10, 11 being mutually distorted. This way, a radial gap forms between the clamping segments 13 and the outer ring 3, here no moment is transmitted.

In order to actuate the clutch, the inner ring 2 is displaced axially in reference to the outer ring 3 for example via an actuator, a pressure piston, or the like. This way, the clamping segments 13 at the ramps 7, 8, 10, 11 are displaced radially outwardly via the ramp device 12 and engage via their clamping areas 19 the annular groove 21 in a friction-fitting fashion. By the different speeds of the inner ring 2 and the outer ring 3 the clamping ring 4 is decelerated or accelerated in reference to the inner ring, causing a relative distortion of the ramp device 9 with the inclines of the ramps 7, 8, 10, 11 arranged in the circumferential direction and thus a relative distortion of the clamping ring 4 in reference to the inner ring 2. This way the clamping segments 13 are pushed against the outer ring in a self-reinforcing fashion and the clamping connection 22 can transmit a greater moment.

In order to open the clutch 1 again, the inner ring 2 is displaced in the opposite direction of the axial incline of the ramps 7, 8, 10, 11. This way, the pre-stressing of the clamping segments 13 is reduced in reference to the outer ring 3 and the clamping ring 4 rotates back into its original position, becoming pre-stressed on the inner ring 2, so that the force-fitting connection of the clamping segments 13 at the outer ring 3 is released again.

LIST OF REFERENCE CHARACTERS

1 Clutch
2 Inner ring
3 Outer ring
4 Clamping ring
5 Inner perimeter
6 Inner gears
7 Ramp
8 Ramp
9 Ramp device
10 Ramp
11 Ramp
12 Ramp device
13 Clamping segment
14 Recess
15 Recess
16 Recess
17 Penetration
18 Inner perimeter
19 Clamping area
20 Peak
21 Annular groove
22 Clamping connection
d Axis of rotation

The invention claimed is:

1. A clutch comprising an inner ring arranged about an axis of rotation, an outer ring arranged coaxially in reference to the inner ring, an elastic clamping ring arranged between and radially limited by the inner ring and the outer ring, the inner ring and the clamping ring resting on each other via a ramp device arranged bi-directionally effective in a circumferential direction, the clamping ring including clamping segments pointing radially outwardly and arranged distributed over a circumference, such that a clamping connection is provided during a radial displacement of the clamping ring with respect to the outer ring, at least in the circumferential direction, the ramp device provides for the radial displacement of the clamping ring, the ramp device is effective in an axial direction and switched by an axial displacement of the inner ring relative to the clamping ring, the clamping segments have, in cross-section, peaks which form the clamping connection with an inner perimeter of the outer ring, and the clamping segments form the clamping connection radially outward with an annular groove of the outer ring.

2. The clutch according to claim 1, wherein the clamping ring is open at one side.

3. The clutch according to claim 1, wherein the clamping segments are separated from each other via recesses extending radially inward, and a pair of circumferentially adjacent recesses have different profiles from each other with different radial depths.

4. The clutch according to claim 3, wherein the clamping segments are separated from each other via recesses inserted radially from inside.

5. The clutch according to claim 4, wherein the radially inner and radially outer recesses are arranged on a same circumference.

6. The clutch according to claim 1, wherein the peaks of the clamping segments have a trapezoidal profile.

7. The clutch according to claim 6, wherein the annular groove of the outer ring has a triangular profile with an angled tip.

* * * * *